US010195559B2

(12) United States Patent
Canfield

(10) Patent No.: US 10,195,559 B2
(45) Date of Patent: Feb. 5, 2019

(54) CONNECTOR AND JOINED PLEATED FILTER SECTIONS

(71) Applicant: Jeff Allen Canfield, Belton, MO (US)

(72) Inventor: Jeff Allen Canfield, Belton, MO (US)

(73) Assignee: BHA Altair, LLC, Franklin, TN (US)

( * ) Notice: Subject to any disclaimer, the term of this patent is extended or adjusted under 35 U.S.C. 154(b) by 91 days.

(21) Appl. No.: 15/289,802

(22) Filed: Oct. 10, 2016

(65) Prior Publication Data
US 2018/0099239 A1    Apr. 12, 2018

(51) Int. Cl.
| B01D 46/00 | (2006.01) |
| B01D 46/52 | (2006.01) |
| B01D 46/02 | (2006.01) |
| B01D 46/24 | (2006.01) |
| F16B 7/22 | (2006.01) |

(52) U.S. Cl.
CPC ....... B01D 46/0005 (2013.01); B01D 46/002 (2013.01); B01D 46/008 (2013.01); B01D 46/0021 (2013.01); B01D 46/0024 (2013.01); B01D 46/02 (2013.01); B01D 46/2403 (2013.01); B01D 46/521 (2013.01); *B01D 2265/02* (2013.01); *B01D 2265/028* (2013.01); *B01D 2271/027* (2013.01); *F16B 7/22* (2013.01)

(58) Field of Classification Search
CPC ............ B01D 46/0021; B01D 46/2414; B01D 46/521; B01D 2265/021; B01D 2265/022
USPC ........................ 55/284, 302, 341.5; 95/2, 280
See application file for complete search history.

(56) References Cited

U.S. PATENT DOCUMENTS

| 3,963,467 A * | 6/1976 | Rolschau ........... B01D 46/0067 55/284 |
| 5,261,934 A * | 11/1993 | Shutic .................. B01D 46/002 95/280 |
| 5,746,792 A | 5/1998 | Clements et al. |
| 7,905,935 B2 | 3/2011 | Clements |
| 7,927,392 B2 | 4/2011 | Clements et al. |
| 2006/0032197 A1 | 2/2006 | Pyron |
| 2009/0241489 A1 | 10/2009 | Becker et al. |
| 2010/0023895 A1 | 1/2010 | Benko et al. |

(Continued)

FOREIGN PATENT DOCUMENTS

| CN | 203315893 U | 12/2013 |
| EP | 0487831 A1 | 6/1992 |

(Continued)

*Primary Examiner* — Duane Smith
*Assistant Examiner* — Minh Chau T Pham
(74) *Attorney, Agent, or Firm* — Reinhart Boerner Van Deuren P.C.

(57) ABSTRACT

A baghouse and filter assembly is provided for at least partially removing particulate matter from a gas stream. The filter assembly includes a first and second filter sections to be coupled together by a coupler for establishing fluid communication between the first and second filter sections when connected. The coupler includes a first coupling portion including an interior passage through which the gas stream can pass in an axial direction between the first and second filter sections and a hook projecting from the first coupling portion. The coupler includes a gasket that sealingly engages both the first and second coupling portions when the first coupling portion is connected with the second coupling portion to form a substantially gas-tight seal.

24 Claims, 7 Drawing Sheets

(56) References Cited

U.S. PATENT DOCUMENTS

| | | | |
|---|---|---|---|
| 2010/0024639 A1* | 2/2010 | Taylor | B01D 46/0032 95/2 |
| 2010/0101195 A1* | 4/2010 | Clements | B01D 46/0021 55/341.5 |
| 2010/0224065 A1 | 9/2010 | Clarke et al. | |
| 2011/0258976 A1 | 10/2011 | Krueger | |
| 2015/0336041 A1 | 11/2015 | Hatfield et al. | |

FOREIGN PATENT DOCUMENTS

| WO | WO 2012038317 A1 | 3/2012 |
|---|---|---|
| WO | WO 2012137303 A1 | 10/2012 |

* cited by examiner

CONNECTOR AND JOINED PLEATED FILTER SECTIONS

FIELD OF THE INVENTION

This invention generally relates to a filter assembly for use in a baghouse. In particular, the present invention relates to a connector for joining pleated media filter sections to form a filter assembly.

BACKGROUND OF THE INVENTION

There is increasing environmental regulatory control throughout the world. Much of the regulatory control is focused on reducing air-borne pollutants and emissions from certain industrial sources, such as power plants and materials production facilities. A known technique to control the pollutants and emissions from the industrial sources is to separate undesirable particulate matter that is carried in a gas stream by fabric filtration. Such fabric filtration is accomplished in a dust collection apparatus known in the industry as a "baghouse."

The baghouse typically includes a housing divided into two plenums by a tube sheet. One plenum is a "dirty air" plenum which communicates with an inlet and receives "dirty" or particulate laden gas from a source at the plant. The other plenum is a "clean air" plenum which receives cleaned gas after filtration and communicates with an outlet to direct cleaned gas away from the baghouse. A plurality of relatively long cylindrical fabric filters, commonly called "bags," are suspended from the tube sheet in the dirty air plenum. Each bag has a closed lower end and is installed over a cage. Each bag is mounted to the tube sheet at its upper end and hangs vertically downward into the dirty air plenum. The upper end portion of the bag is open and the interior of each bag is in fluid communication with the clean air plenum. In operation, particulate laden gas is conducted into the dirty air plenum. As the particulate laden gas flows through the baghouse, the particulates carried by the gas engage the exterior of the fabric filter bags and accumulate on or in media of the fabric filter bags or are separated from the gas stream and fall into an accumulator chamber at the lower portion of the dirty air plenum. Cleaned gas then flows through the media of the fabric filter bags, into the interior of the fabric filter bags, to the clean air plenum and through the outlet. Although many baghouses are made according to this basic structure, there may be numerous operational and structural differences among baghouses.

There is interest in replacing known fabric filter bags with pleated media filter cartridges to increase the effective filtering area while occupying the same, or less, space within the baghouse. However, certain barriers to easy replacement of fabric filter bags by pleated media filter cartridges exist. In some baghouse designs, the fabric filter bags can have a length of about four meters. The clean air plenum often has a clearance height that is substantially less than four meters, for example, about two meters. It is generally not a problem to install fabric filter bags in the baghouse since the fabric filter bags are foldable, flexible and non rigid. A relatively long and rigid pleated media filter cartridge cannot be installed without considerable manipulation if it can be installed at all due to the limited access space in the clean air plenum.

In order to occupy the same space within the baghouse as a fabric filter bag, the length of the pleated media filter cartridge would be relatively long and can be up to about four meters in length or more. This presents a problem for filter manufacturers because there are effective limits as to the width of the filter media that can be pleated with current production machinery. The current production machinery used to pleat filter media typically cannot accommodate continuous filter media more than about two meters in width. Such a long filter cartridge would also be relatively difficult to handle, transport and install.

Conventional connector structures have included compatibly-threaded portions that are screwed together to connect two axially aligned filter sections. Such threaded connectors are difficult to connect when there are imperfections in the threads themselves, and efforts to minimize formation of such imperfections during manufacturing have proven to be expensive. Despite best efforts to minimize such imperfections during manufacturing, an unacceptable number of incompatibly-threaded connectors that will be difficult to connect may still result. Accordingly, there is a need in the industry for improvements in filter structure, including a connector for coupling a plurality of axially aligned filter sections together.

Further, many shipping companies have regulations on the maximum a packages maximum length or width that they are willing to ship or that the price to ship a package over a certain length or width is disproportionately more expensive to ship than two or more smaller packages that when combined meet the dimensions of the single larger package. Accordingly, there is a need in the industry for a filter assembly having multiple filter sections that can be shipped in smaller packages and then connected together by a coupler to for the filter assembly.

The invention provides such connector to joined pleated filter sections. These and other advantages of the invention, as well as additional inventive features, will be apparent from the description of the invention provided herein.

BRIEF SUMMARY OF THE INVENTION

According to one aspect a filter assembly is provided comprising a first filter section having a first filter media attached to a first coupling portion and a second filter section having a second filter media attached to a second coupling portion. The first and second coupling portions forming a coupling to selectively secure the first filter section to the second filter section. The coupling fluidly communicating a first internal cavity of the first filter media to a second internal cavity of the second filter media. The first coupling portion including a first tubular section in fluid communication with the first internal cavity and including a first radially extending hook portion. The second coupling portion including a second tubular section in fluid communication with the second internal cavity and including a second radially extending hook portion. The first or second tubular section axially receiving therein the other one of the second or first tubular section and a seal member radially located between the first and second tubular sections preventing fluid bypass the first and second coupling portions. The first and second hook portions being configured to slide axially past one another when connecting the first filter section to the second filter section and axially engaging when attempting to axially disconnect the first filter section from the second filter section.

According to another aspect a filter assembly is provided having a first hook portion formed from a plurality of radially flexible sections. The radially flexible sections flexing radially from an un-flexed state as the first and second hook portions slide axially past one another when connecting the first filter section to the second filter section and then returning radially toward the un-flexed state after sliding axially past the second hook portion such that the first and second hook portions will axially engage when attempting to axially disconnect the first filter section from the second filter section.

According to another aspect a filter assembly is provided where at least one slot is formed in the first hook portion between adjacent ones of the plurality of radially flexible sections.

According to another aspect a filter assembly is provided where the first hook portion has to be radially flexed prior to disconnecting the first filter section from the second filter section.

According to yet another aspect a filter assembly is provided where the second filter section has a third filter coupling substantially identical to the first coupling portion. The third filter section including a fourth coupling portion substantially identical to the second coupling portion. The third filter coupling connecting with the fourth filter coupling to connect the third filter section to the second filter section.

According to yet another aspect a filter assembly is provided where the first filter section includes a mounting member for mounting the first filter section to a tube sheet and the second filter section further includes a closed end cap.

According to still yet another aspect a filter assembly is provided where the second filter section further includes a mounting member for mounting the second filter section to a tube sheet and the third filter section further includes a closed end cap.

According to still yet another aspect a filter assembly is provided where flexible portions of the first hook portion flex radially outward and have an inner diameter smaller than an outer diameter of the second hook portion According to still yet another aspect a filter assembly is provided where the first tubular section has an inwardly extending portion and the second tubular section has a top portion and that contact between the inwardly extending portion and the top portion prevent the radial movement of the first coupling portion relative to the second coupling portion.

According to still yet another aspect a filter assembly where a groove is provided in the tubular section of the second coupling portion and where a gasket is located in the groove.

According to still yet another aspect a filter assembly is provided where 1200-1600 pounds of axial pull force is required to axially disconnect the first and second hook portions.

According to still yet another aspect a filter assembly is provided where the first coupling portion is formed as a part of a first end cap on a first axial end of a first piece of filter media and the second coupling portion is formed as part of a second end cap on a second axial ends of a second piece of filter media.

According to another aspect a coupler to secure a first filter section to a second filter section is provided. The coupler having a first coupling portion and a second coupling portion. The first coupling portion including a first tubular section and a first radially extending hook portion and the second coupling portion including a second tubular section and a second radially extending hook portion. The first or second tubular section axially receiving therein the other one of the second or first tubular section and a seal member radially located between the first and second tubular sections preventing fluid bypass between the first and second coupling portions. The first and second hook portions being configured to slide axially past one another and axially engaging when attempting to axially disconnect first and second hook portions.

According to yet another aspect the coupler having a first hook portion that is formed from a plurality of radially flexible sections. The radially flexible sections flexing radially from an un-flexed state as the first and second hook portions slide axially past one another when coupling the first coupling portion to the second coupling portion and then returning radially toward the un-flexed state after sliding axially past the second hook portion such that the first and second hook portions will axially engage when attempting to axially disconnect the first and second coupling portion.

According to yet another aspect the coupler having slots formed in the first hook portion between adjacent radially flexible sections.

According to yet another aspect the coupler where the first hook portion must be radially flexed prior to disconnecting the first coupling portion from the second coupling portion.

According to yet another aspect the coupler where the first hook portion flexes radially outward and has an inner diameter smaller than an outer diameter of the second hook portion.

According to yet another aspect the coupler where the first or second tubular section axially receiving therein the other one of the second or first tubular section has an inwardly extending portion that acts to prevents the over insertion of the first or second tubular section being axially received.

According to yet another aspect the coupler where a groove is provided in the first or second tubular section and the seal member is located in the groove.

According to yet another aspect the coupler where 1200-1600 pounds of axial pull force is required to axially disconnect the first and second hook portions.

According to another embodiment a method of replacing a filter assembly within a baghouse is provided including removing a filter assembly to be replaced from a tube sheet and leaving a vacant opening in the tube sheet. Then selecting a first filter section having a mounting member coupled to a first axial end of a first piece of tubular filter media and a first coupling portion located at a second axial end of the first piece of filter media. Then selecting a second filter section having a second coupling portion coupled to a first axial end of a second piece of tubular filter media to provide fluid communication between the first and second filter sections and a closed end cap coupled to a second axial end of a second piece of tubular filter media.

According to yet another aspect the method further comprising partially inserting the second filter section to the vacant opening in the tube sheet.

According to yet still another aspect the method comprising coupling the first coupling portion to the second coupling portion such that a seal member radially located between the first and second coupling portions prevents fluid bypass therebetween.

According to yet still another aspect the method further comprising axially sliding the coupled first and second filter sections axially along the opening of the tube sheet until a gas-tight seal is formed between the mounting member and the tube sheet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

All references, including publications, patent applications, and patents cited herein are hereby incorporated by reference to the same extent as if each reference were individually and specifically indicated to be incorporated by reference and were set forth in its entirety herein.

Figure 1:
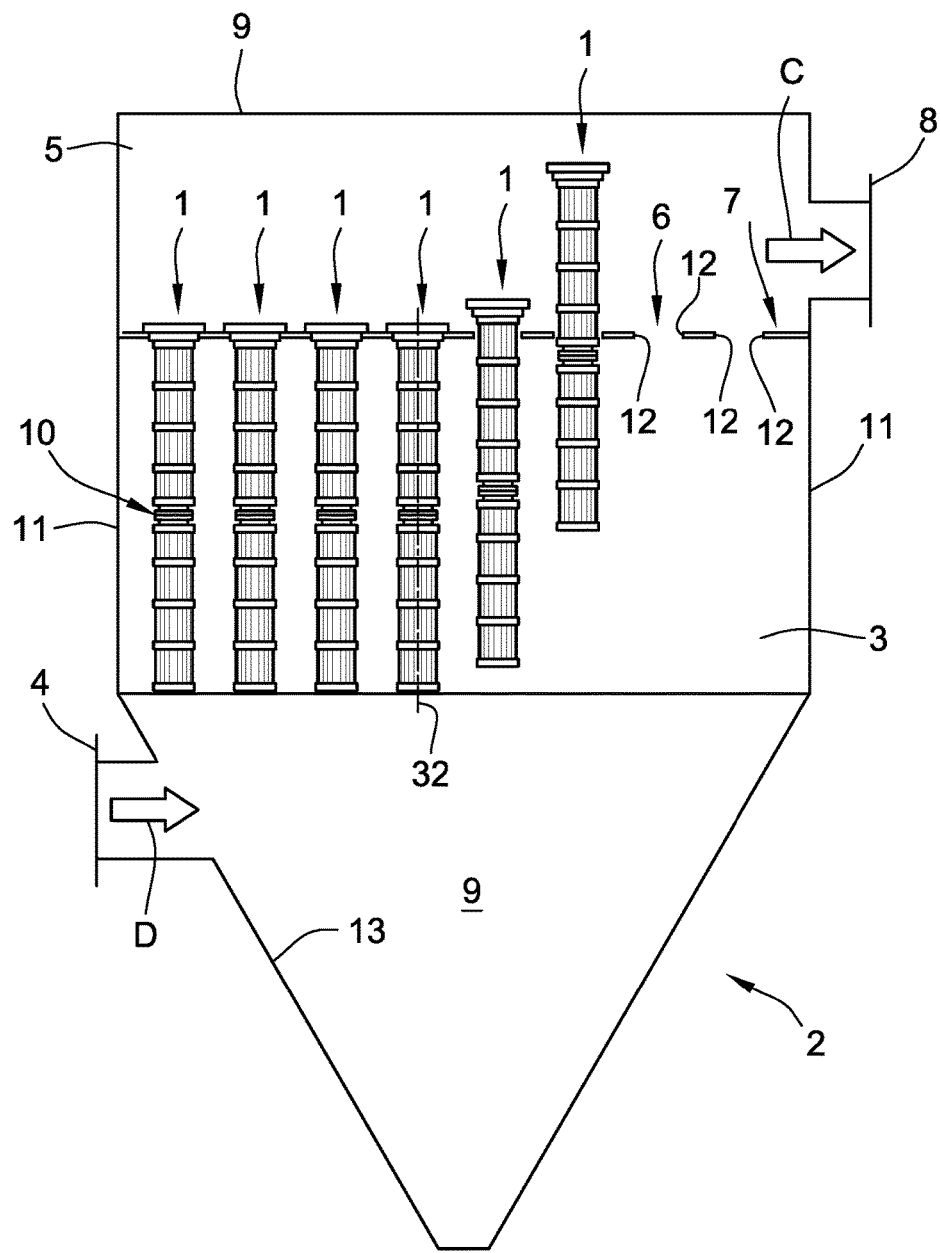
FIG. 1 is a schematic view of the interior of a baghouse in which a plurality of filter assemblies are loaded for at least partially removing particulate matter entrained within a gaseous stream.

A baghouse 2 is illustrated in FIG. 1. The baghouse 2 is made from any suitable material, such as sheet metal. The baghouse 2 includes sides 11 and a roof 9. Particulate laden gas flows into the baghouse 2 from an inlet 4, as represented by arrow D at inlet 4. The particulate laden gas is filtered by a plurality of relatively long cartridges or filter assemblies 1 (see FIG. 2) constructed according to one or more aspects of the invention located within the baghouse 2. Cleaned gas exits through an outlet 8 of the baghouse 2, as represented by arrow C at outlet 8 after passing through the filter assemblies 1.

The baghouse 2 is divided into a "dirty air" plenum 3 and a "clean air" plenum 5 by a tube sheet 7 made from a suitable material, such as sheet metal. The tube sheet 7 has at least a portion that is substantially planar. The inlet 4 is in fluid communication with the dirty air plenum 3. The outlet 8 is in fluid communication with the clean air plenum 5.

A plurality of openings 6 extend through the planar portion of the tube sheet 7. A filter assembly 1 is installed in a respective opening 6, and can optionally extend at least partially through the respective opening 6. The filter assembly 1 can be suspended by the tube sheet 7 itself, or by any other suitable support adjacent to the openings 6 in which the filter assembly 1 is to be installed.

The clean air plenum 5 has a minimum dimension or clearance height taken in a direction normal to the tube sheet 7 that defines an access space.

The dirty air plenum 3 has a height taken in a direction normal to the tube sheet 7 in which a filter assembly 1 can be installed without engaging the sides 11 of the baghouse 2. The height of the dirty air plenum 3 is typically greater than the height of the clean air plenum 5.

The baghouse 2 is illustrated as having a non-movable roof 9. Thus, access to the clean air plenum 5 and baghouse 2 is limited for installation of the filter assemblies 1. It will be apparent to one skilled in the art that the roof 9 can have access panels that are removable or movable to a position that does not inhibit access to the clean air plenum 5.

The baghouse 2 also has an accumulation chamber defined by sloped walls 13 located at a lower end of the dirty air plenum 3. The filter assemblies 1 are illustrated as not extending into the accumulation chamber but it will be apparent that the filter assemblies may extend into the accumulation chamber.

A circumferentially-resilient mounting band 12 is located in one of the openings 6 in the tube sheet 7. The band 12 can be made from any suitable material, like a metal, such as stainless steel, and may also be covered with a fabric. The band 12 ensures that the filter assembly 1 may be used with openings 6 that have not been precisely cut, allowing for a suitable manufacturing tolerance without significantly affecting the performance of the baghouse 2 due to leakage between the tube sheet 7 and the filter assemblies 1.

The band 12 is constructed with an outer diameter substantially equal to the inner diameter of the opening 6. The band 12 may be easily deformed from its normally circumferential shape and inserted into the opening 6. The exterior surface of the band 12 snugly engages the surface defining the opening 6. The band 12 provides a seal between the filter assembly 1 and the opening 6 in the tube sheet 7 to minimize the passage of gas from the dirty air plenum 3 into the clean air plenum 5 between the filter assembly 1 and the tube sheet 7 (see FIG. 3).

Figure 2:
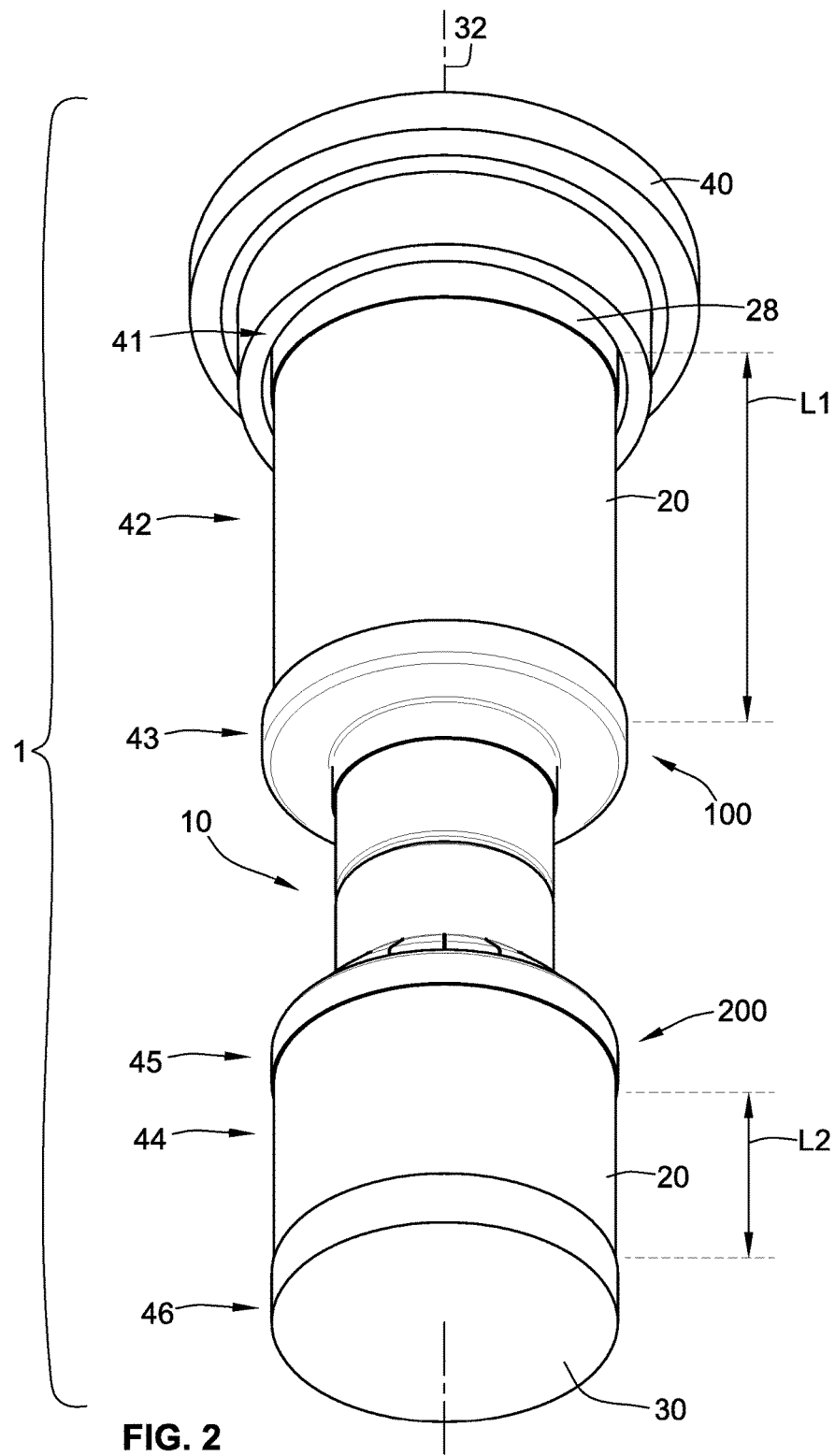
FIG. 2 is a perspective view of a filter assembly according to an aspect of the invention.
Figure 3:
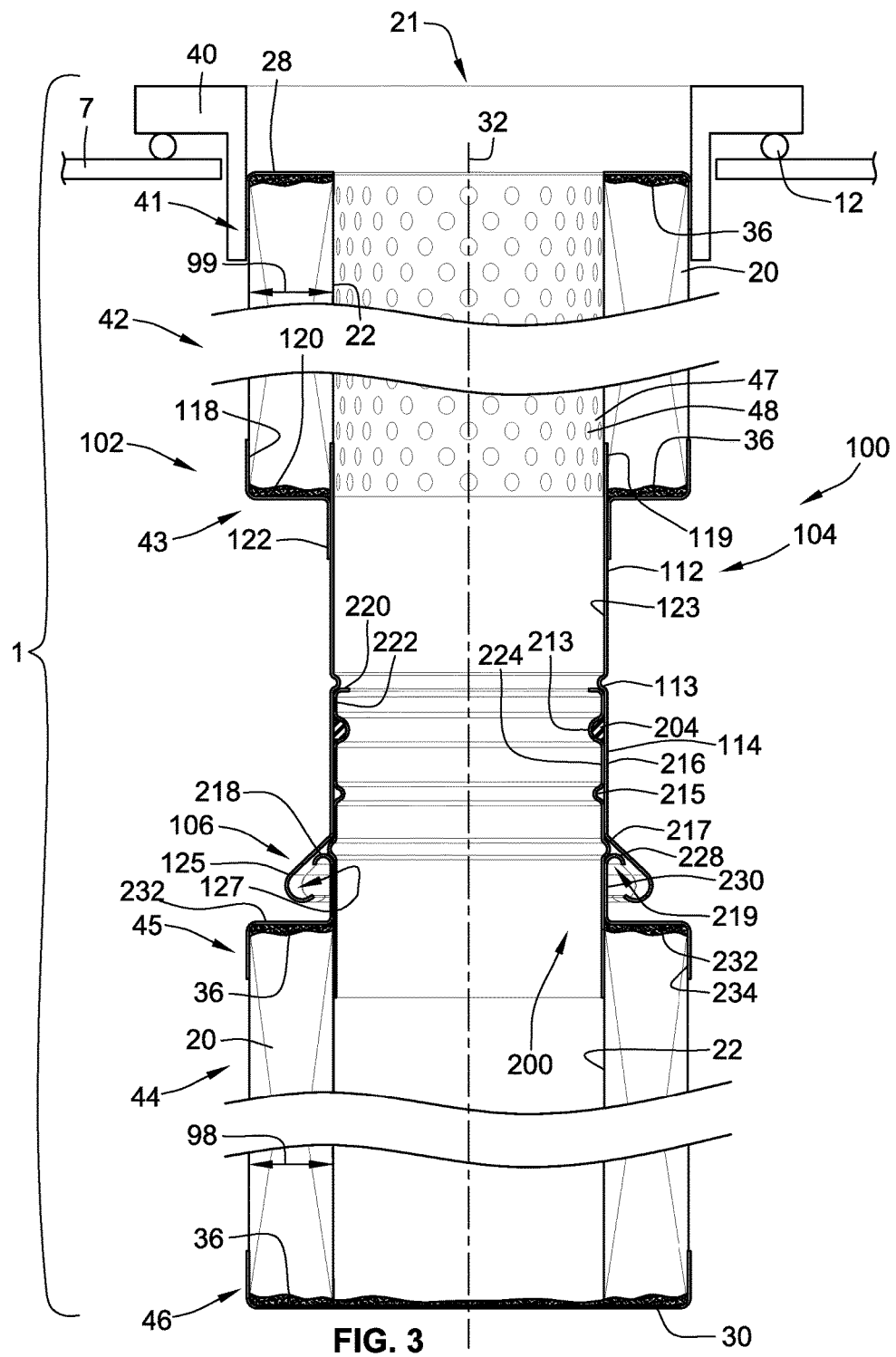
FIG. 3 is a cross-sectional view of the filter assembly of FIG. 2 including an exemplary illustration of the filter assembly coupled to a tube sheet.

Turning to FIGS. 2-3, the filter assemblies 1 filter particulates from the particulate laden gas as it passes through each filter assembly 1. Each filter assembly 1 is made up of a first filter section 42 and a second filter section 44. The first and second filter sections 42, 44 are axially aligned in an end-to-end stack and connected together in a fluid tight relationship by a coupler 10 provided by interconnected first and second coupling portions 100, 200 (see FIGS. 4-6).

Each filter assembly 1 has a mounting sleeve 40 (see FIGS. 2 and 3) for interacting with the opening 6 of the tube sheet 7 such that the filter assemblies hang substantially vertically. The mounting sleeve 40 typically bears the entire weight of the filter assembly 1 as the filter assembly 1 hangs from the tube sheet 7. Typically, the mounting sleeve 40 has an outer diameter that is greater than the outer diameter of the band 12, which seals the mounting sleeve 40 to the tube sheet 7 (see FIG. 3).

As will be understood, the mounting sleeve 40 can be made from any suitable material, such as, but not limited to stamped, drawn or otherwise formed metal, such that when the filter assembly 1 is inserted the tube sheet 7 the mounting sleeve 40 is capable of supporting the full weight of the filter assembly 1 even after it has been fully loaded with particulate matter as the filter assembly 1 hangs as a cantilevered extension from the tube sheet 7.

With additional reference to FIG. 1, each filter assembly 1 has a longitudinal central axis 32, and an overall length taken in a direction parallel to the axis 32. The length of the filter assembly 1 is typically greater than the clearance height of the clean air plenum 5 and preferably less than the access height of the dirty air plenum 3 at least in the location closest to the inner periphery of the housing 2. It will be apparent that any number and lengths of filter assemblies 1 could be utilized that are suitable to the filtering requirements of the baghouse 2.

The length of the filter assembly 1 can be any desired length that is appropriate for particular filtering requirements. In one example, at least one of the first and second filter sections 42, 44 of the filter assembly 1 has a length in the range of one meter to two meters. Preferably, the length of the first or second filter sections 42 or 44 is less than the clearance height in the access space of the clean air plenum 5. It will also be apparent that the length of the first filter section 42 can be different from the length of the second filter section 44. For example, in one embodiment the first filter section 42 may be 1 meter in length and the second filter section 44 may be two meters in length.

With primary reference to FIG. 3, filter media 20 of the first filter section 42 and the second filter section 44 is formed in a substantially tubular shape and creates an internal cavity defined by the interior surface 22 of the filter media 20. The filter media 20 of the first filter section 42 has an effective filtering length or axial extent L1 (see FIG. 2), while the filter media 20 of the second filter section 44 has an effective filtering length or axial extent L2 (see FIG. 2).

According to one embodiment the first and second filter sections 42, 44 can have filter media 20 that is a pleated filter media. However, it will be understood that first and second filter sections 42, 44 are not required to have filter media 20 that is pleated and the filter media 20 could take the form of any other materially different configurations generally known in the art. For example, according to other exemplary non-limiting embodiments, the first and second filter sections 42, 44 can have filter media 20 in the form of, but not limited to, a tube shaped structure, and the filter media 20 can be, but is not limited to be being composed of, a PEACH® filter media, manufactured by PECOFacet of Mineral Wells, Tex., other wound tubular constructions of filter media, fiberglass filter media, tubes of pleated synthetic filter media, pleated fiberglass filter media, pleated cellulose filter media, carbon filter media, melt blown filter media or string wound filter media.

Turning to FIG. 3 the first filter section 42 is open at its first axial end 41 as well as its second axial end 43. The mounting sleeve 40 is located at the first axial end 41 and a first coupling portion 100 is located at the second axial end 43. The first coupling portion 100 acts to connect the first filter section 42 with the second filter section 44. The first filter section 42 has an open end cap 28 that is coupled to the mounting sleeve 40. The open end cap 28 and the mounting sleeve 40 can be formed as a single piece or can be formed as two separate pieces and coupled together. It will be understood that if the open end cap 28 and the mounting sleeve 40 are formed as two separate pieces then they can be coupled together to form a gas-tight seal by any means generally known in the art, such as, but not limited to, spot welding, gaskets and/or adhesives.

The mounting sleeve 40 and the open end cap 28 define an open axial end 21 of the first filter section 42 for fluid communication with the clean air plenum 5. The first filter section 42 has a generally-circular cross section.

As will also be understood the open end cap 28 and the first coupling portion 100 are made up from a suitable material, such as stamped, drawn or otherwise formed metal and can be connected to the filter media 20 by any means generally known in the art such as, but not limited to, adhesives or a potting material 36, such that a strong robust seal is formed between the open end cap 28 and the filter media 20 as well as between the first coupling portion 100 and the filter media 20. Further, the open end cap 28 could be plastic with filter media 20 embedded therein.

The first filter section 42 illustrated in FIG. 3 also has a perforated support core 47 that can provide structural support to the first filter section 42. The perforated support core 47 has apertures 48 to allow for fluid flow through the perforated support core 47. The perforated support core 47 can be made from any suitable material, such as stamped, drawn or otherwise formed metal, or plastics.

The open end cap 28 and the first coupling portion 100 can be coupled to the filter media 20 as well as any other portion of the first filter section 42, such as, but not limited to the perforated support core 47. In one exemplary embodiment, the open end cap 28 and/or the first coupling portion 100 can be formed as separate pieces and then coupled to the perforated support core 47, by any means generally known in the art, such as, but not limited to, spot welding or adhesives. In another exemplary embodiment the open end cap 28 and/or the first coupling portion 100 and the perforated support core 47 can be formed by a single of material, such as but not limited to, a stamped or drawn metal or a plastic. Thus, eliminating the need to couple the open end cap 28 and/or the first coupling portion 100 to the perforated support core 47.

As will be readily understood, coupling the open end cap 28 and/or the first coupling portion 100 to the perforated support core 47 provides additional structural support to the first filter section 42 or any additional filter sections (see FIG. 7) that may be connected to the first filter section 42, even if the filter sections making up the filter assembly 1 have acquired a heavy accumulation of particulates.

Next, the second filter section 44 also includes a filter media 20. The second filter section 44 has first axial end 45 and a second axial end 46. The second coupling portion 200 is coupled to the filter media 20 at the first axial end 45 of the second filter section 44 and the filter media 20 is coupled to a closed end cap 30 at second axial end 46.

The second coupling portion 200 and the closed end cap 30 are made from a suitable material, such as stamped, drawn or otherwise formed metal, or a plastic. The second coupling portion 200 and the closed end cap 30 can be coupled to the filter media 20 by any means generally known in the art, such as, but not limited to adhesives or a potting material 36 or embedding if formed from plastic. As will be understood the potting material 36 forms a strong and robust air tight seal between the closed end cap 30 and the filter media 20 as well as between the second coupling portion 200 and the filter media 20.

As will also be understood, the closed end cap 30 and the second coupling portion 200 can be coupled to the filter media 20 or any other section of the second filter section 44 by any means known in the art. For example, the closed end cap 30 may be coupled to or integrally formed with a perforated core 47 as discussed above relative to the first filter section 42.

Figure 4:
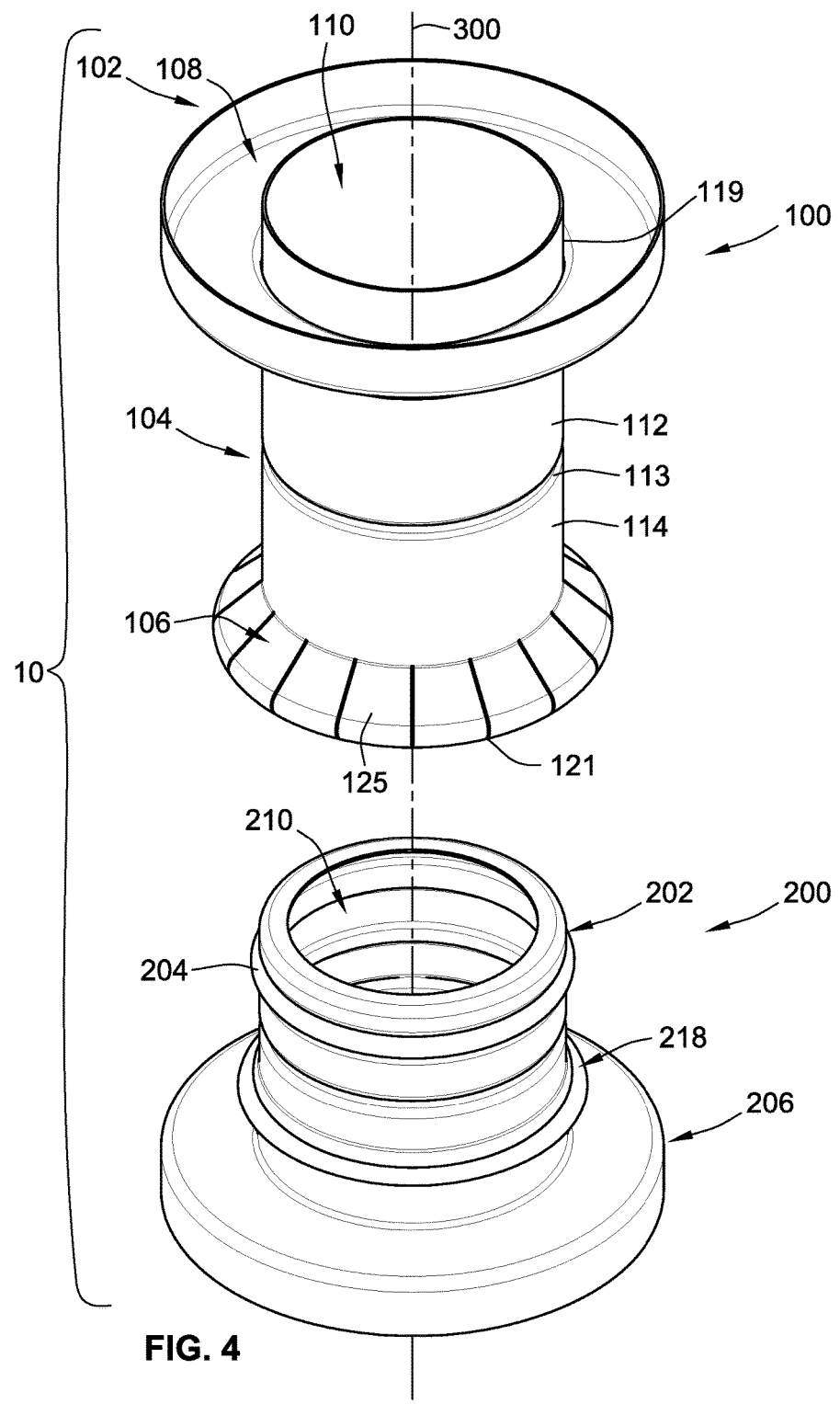
FIG. 4 is a perspective view of a coupler including a first coupling portion and a second coupling portion according to an aspect of the invention.
Figure 5:
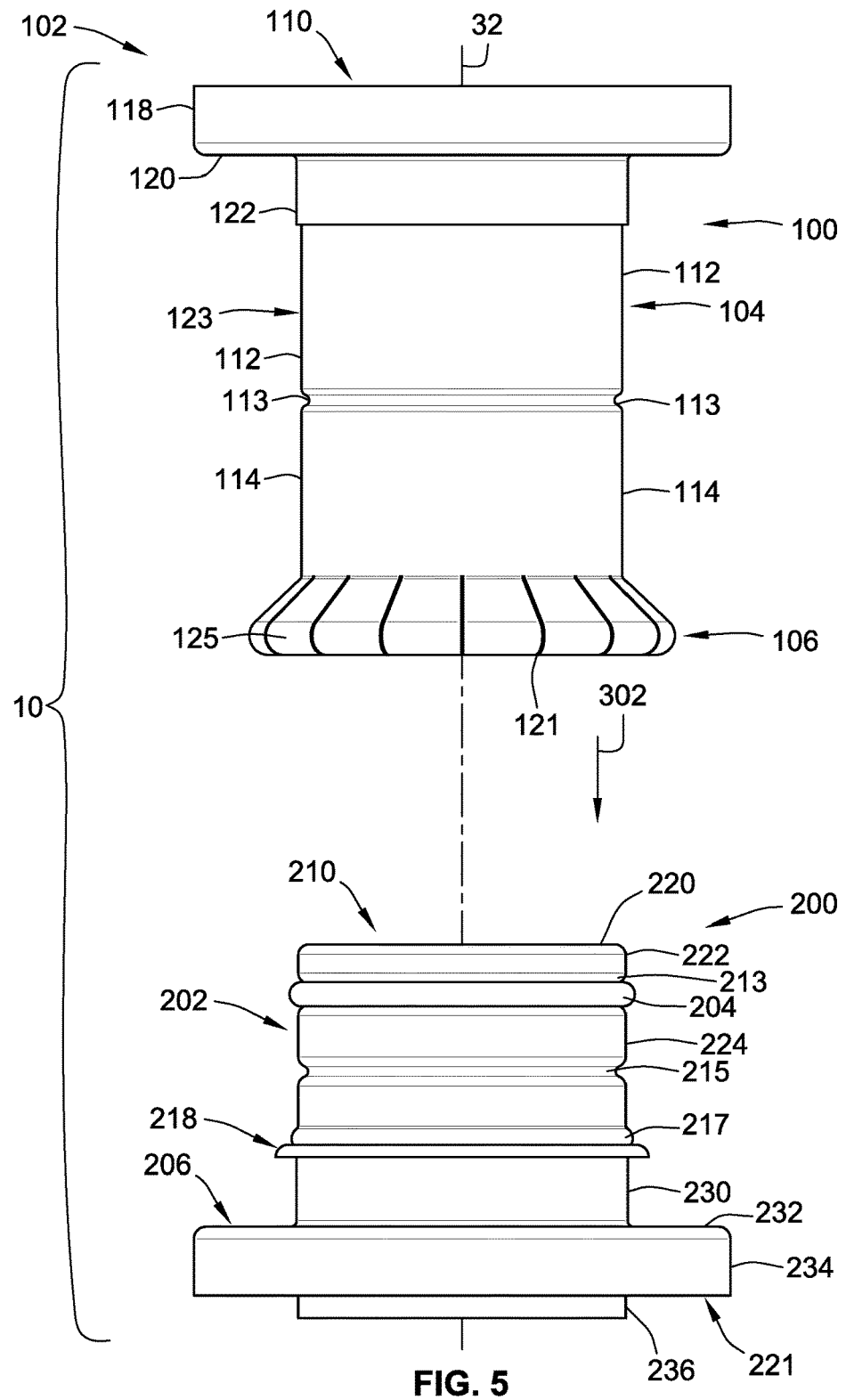
FIG. 5 is a side-view of the coupler of FIG. 4.
Figure 6:
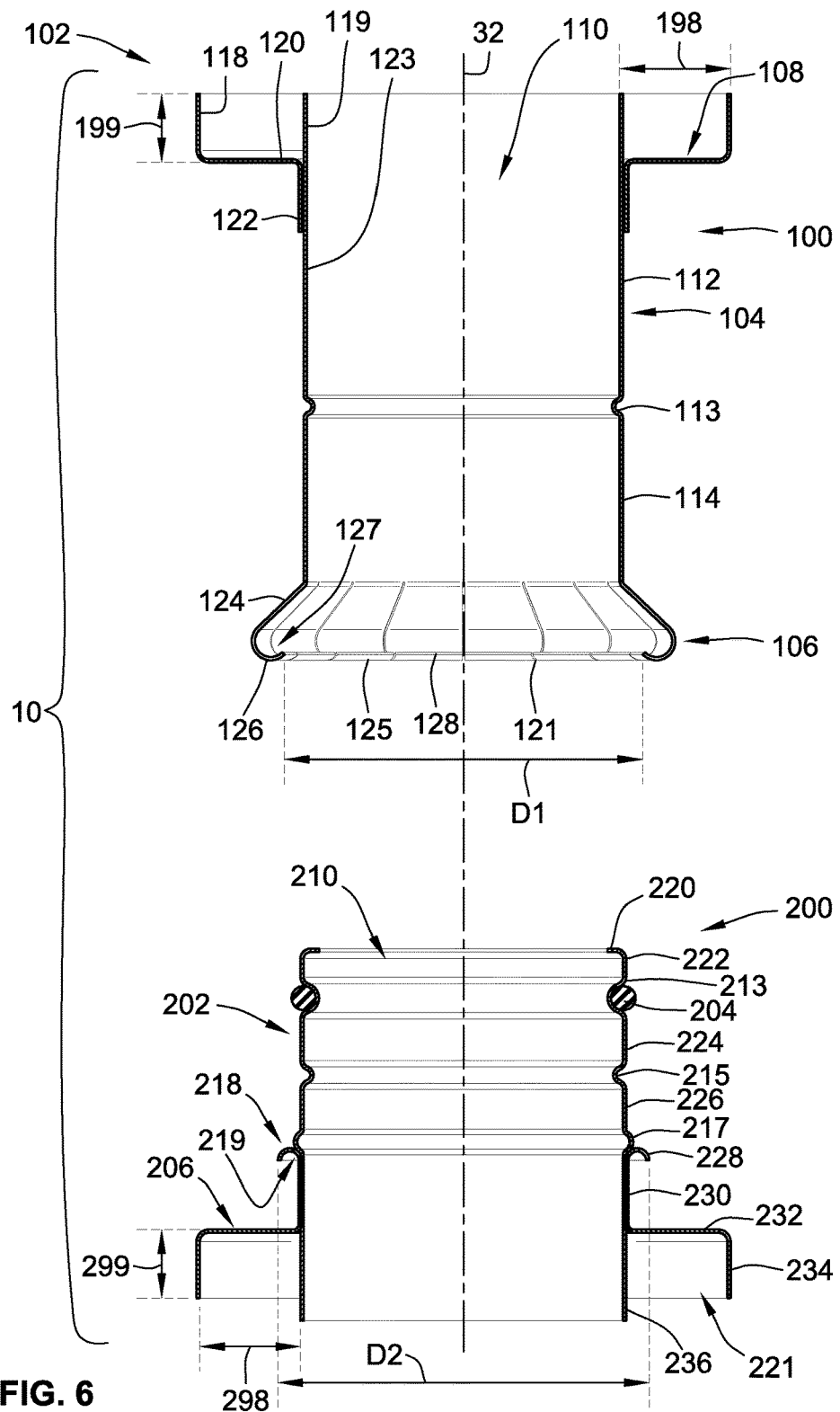
FIG. 6 is a cross-sectional view of the coupler of FIG. 5.

Turning to FIGS. 4-6, and with primary reference to FIG. 6, the first coupling portion 100 has a tubular section 104 having a collar 102 extending from a first end of the tubular section 104 and a coupling portion 106 extending from the opposite end of the tubular section 104.

The collar 102 is fixed to the second axial end 43 (see FIG. 3) of the first filter section 42, and defines an interior passage 110 (see FIG. 6). The collar 102 receives the portion of the filter media 20 that terminated at the second axial end 43 of the first filter section 42.

The collar 102 defines a cup 108 formed by a cup base 120 that is perpendicularly extending relative to axis 32. An exterior cup wall 118 perpendicularly extends from the cup base 120 to form the cup 108 with the cup base 120. The interior wall 123 of the tubular section 104 extends past the cup base 120 to form an interior cup wall 119 opposite the exterior cup wall 118 (see FIG. 6). The cup 108 has a height 199 defined by the exterior cup wall 118 and the interior cup wall 119. The cup 108 has a width 198 defined by the cup base 120. It will be understood that the height 199 and width 198 of the cup 108 will depend upon the characteristics and size of the filter media 20, such as, but not limited to the thickness 99 (see FIG. 3) of the filter media 20 being used in the first filter section 42.

The cup base 120, the exterior cup wall 118, and the interior cup wall 119 provide a contact surface area between the cup 108 and a piece of filter media 20. According to one non-limiting embodiment, an adhesive or potting material 36 can be applied to the cup base 120, the exterior cup wall 118, and the interior cup wall 119 and a piece of filter media 20 can be inserted into the cup 108, such that a strong and robust seal is formed between the cup 108 and the filter media 20. However, as will be understood, the strong and robust seal formed between the cup 108 and the piece of filter media 20 can be formed by any means generally known in the art and is not limited to being created by the use of adhesives or potting materials 36.

The collar 102 also has a collar sleeve 122 this is perpendicularly extending from the cup base 120 and extends opposite of the exterior cup wall 118 and is radially inward of the exterior cup wall 118. The collar sleeve 122 is secured to the tubular section 104 to create a strong and robust seal between the collar 102 and the tubular section 104. The collar sleeve 122 can be secured to the tubular section 104 by any means generally know in the art, such as, but not limited to, spot welding or adhesives.

The tubular section 104 is composed of a first cylindrical tubular section 112 and a second cylindrical tubular section 114 with a inwardly extending projection forming an outer annular groove 113 disposed between the first cylindrical tubular section 112 and the second cylindrical tubular section 114.

As will be understood, the tubular section 114 has a slightly larger diameter than the second coupling portion 200, which allows for the insertion of the second coupling portion 200 into the tubular section 114 of the first filter portion 100. To prevent the second filter section 44 from tilting relative to the first filter section 42 due to this design clearance the top portion 220 of the second coupling portion 200 contacts the groove 113 of the first coupling portion 100 when the hook 127 of the first coupling portion 100 is engaged with the coupling hook 228 of the second coupling portion 200.

Figure 7:
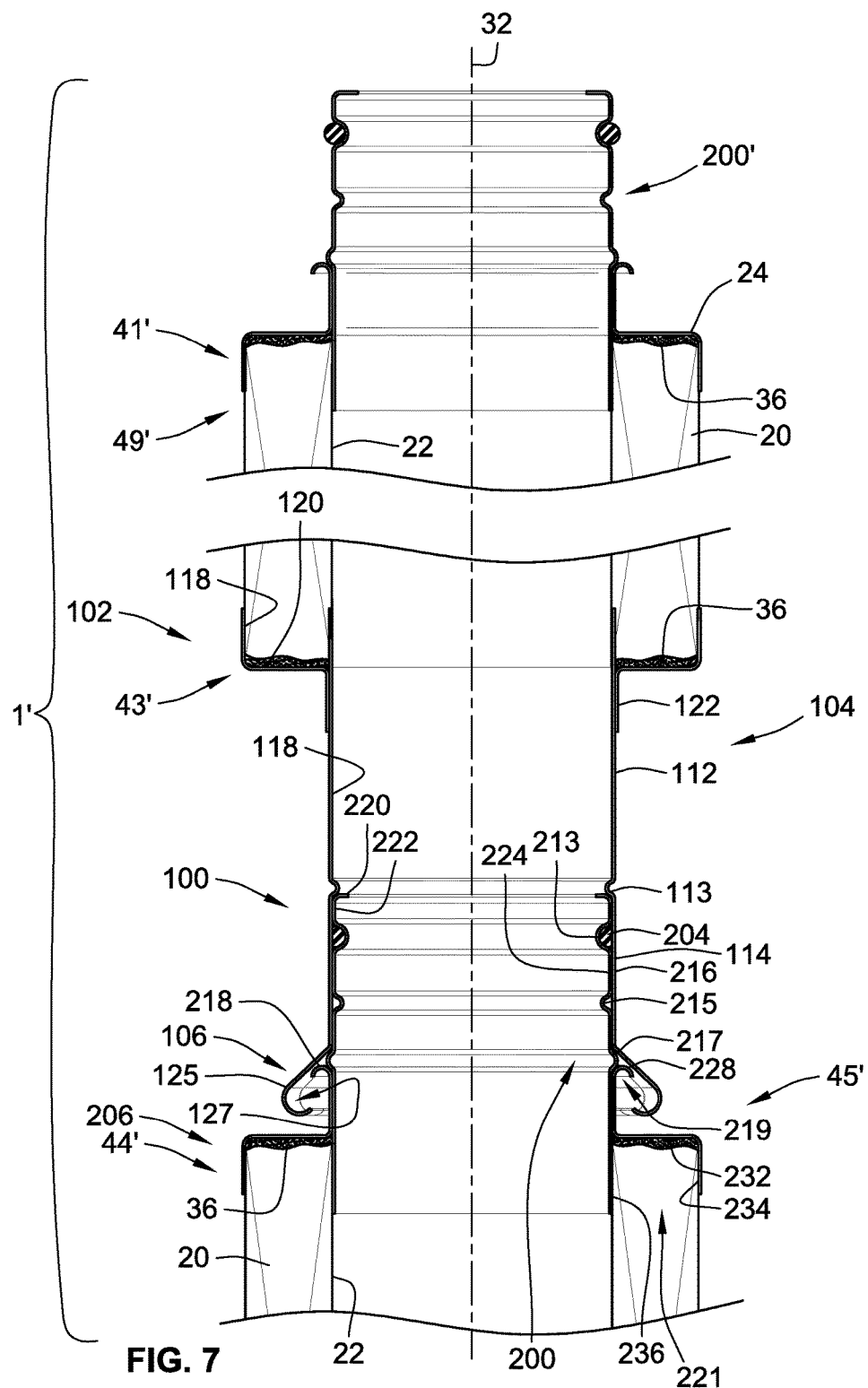
FIG. 7 is a cross-sectional view of a partially assembled filter assembly illustrating a second filter section connected to a third filter that has a first coupling portion located at one axial end of a piece of filter media and a second coupling portion located at the other axial end of the filter media.

In addition, the groove 113 prevents a user from inadvertently inserting the second coupling portion 200 too far within the tubular portion 104 of the first coupling portion 100 by acting as a stopping point for which the end of the top portion 220 of the second coupling portion 200 can no longer be inserted within the tubular portion 104 of the first coupling portion 100 (see FIGS. 3 and 7).

The second cylindrical section 114 terminates into a coupling portion 106. The coupling portion 106 comprises sections 125. Each section 125 includes a wall 124, a curved portion 126, and a lip 128. The wall 124 extends radially outward relative to the second cylindrical tubular section 114 and the curved portion 126 bends radially inward relative to the wall 124 until terminating at the radially inward lip 128.

Adjacent sections 125 have a space 121 therebetween, such that the wall 124 is connected to the tubular portion 104, but each section 125 is not directly connected with other sections 125. This provides the sections 125 with a degree of radial flexibility that allows the sections 125 to have a radially non-extended state and radially extended state.

In the radially non-extended state, the sections 125 are in their natural state (e.g. unflexed state) relative to axis 32. In the extended state, the sections 125 are flexed radially outward relative to axis 32 via a force being applied to the sections 125.

Turning to FIGS. 4-6 and with primary reference to FIG. 6, the second coupling portion 200 has a tubular portion 202 that has a top portion 220 that defines an opening 210. Perpendicularly extending from the top portion 220 is a first cylindrical section 222 and a second cylindrical section 224 with a groove 213 spaced between the first cylindrical section 222 and the second cylindrical section 224 formed by an inwardly extending projection.

A gasket 204 sits within groove 213 and a strong and robust seal is formed between the gasket 204 and the groove 213. The second coupling portion 200 also has a second inwardly extending projection 215 located between the second cylindrical section 224 and a third cylindrical section 226.

The second coupling portion 200 also has a first outwardly extending projection 217 formed between the third cylindrical section 226 and a fourth cylindrical section 236. As will be further discussed below, the first outwardly extending projection 217 of the second coupling portion 200 and the sections 125 of the first coupling portion 100 also act as a stop to prevent the second coupling portion 200 from being inserted too far into the tubular section 104 of the first coupling portion 100 when the first and second coupling portions 100, 200 are connected together (see FIG. 3).

The second coupling portion 200 also has a base member 206 that consists of a horizontal base 232 that extends perpendicular relative to the fourth cylindrical section 236. The horizontal base 232 has a first cylindrical portion 230 extending axially from the horizontal base 232 and a second cylindrical portion 234 extending axially from the horizontal base 232 opposite the first cylindrical portion 230. The second cylindrical portion 234 is radially outward of the first cylindrical portion 230.

To form the first coupling portion 200, the first cylindrical portion 230 is secured to the tubular portion 202 to create a strong and robust seal between a base member 206 and the tubular portion 202 of the second coupling portion 200 (see e.g. FIG. 3). The first cylindrical portion 230 can be secured to the tubular portion 202 by any means generally know in the art, such as, but not limited to, spot welding or adhesives.

Additionally, during the manufacturing process the first outwardly extending projection 217 of the tubular portion 202 may act as a way to precisely position the base member 206 relative to the tubular section 202, which helps to ensure that the tubular portion 202 and the base member 206 are properly located and aligned during the manufacturing process of the second coupling portions 200.

The first cylindrical portion 230 terminates into a coupling hook portion 218 of the second coupling portion 200 and provides coupling hook 228 that at least partially extends around the radius of the second coupling portion 200. The coupling hook 228 provides a coupling groove or catch 219 that helps prevent the second coupling portion 200 and the first coupling portion 100 from disconnecting after the first and second coupling portions 100, 200 have been coupled together to form a strong and robust seal between the first filter section 42 and the second filter section 44.

The second cylindrical portion 234, the fourth cylindrical section 236, and the horizontal base 232 act to form a well 221. The well 221 has a height 299 defined by the second cylindrical portion 234 and a width 298 defined by the horizontal base 232. It will be understood that the height 299 and width 298 of the well 221 will depend upon the characteristics of the filter media 20, such as, but not limited to the thickness 98 (see FIG. 3) of the filter media 20 being used in the second filter section 44.

Potting material 36 can be applied to the well 221 and the filter media 20 at the first axial end 45 (see FIG. 2) of the second filter section 44 and then the filter media 20 can be inserted into the well 221 where the potting material 36 will create a strong and robust seal between the well 221 and the filter media 20.

When mating the first and second coupling portions 100, 200 the sections 125 of the first coupling portion 100 will begin in their non-extended state. Then the first and second coupling portions 100, 200 will be axially aligned and an axial force will be applied to the first and second coupling portions 100, 200 to mate the first and second coupling portions 100, 200. During the mating process the axial force applied to the first and second coupling portion 100, 200 causes sections 125 of the first coupling portion 100 to flex radially outward into their extended state. The contour of the curved portion 126 and coupling hook 228 facilitate this radial biasing of sections 125.

In a preferred embodiment, the coupling portion 106 will have a diameter D1 defined by the lips 128 of the sections 125 that will be smaller than the outermost diameter D2 of the coupling hook 228 while in the non-extended state and the coupling portion 106 will have a diameter defined by the lips 128 of the sections 125 that will be larger than the outermost diameter of the coupling hook 228 while in the extended state (e.g. during connection of the first and second coupling portions 100, 200).

The curved portion 126 and the lip 128 act to provide a hook 127 that engages with the coupling hook 228 of the second coupling portion 200 which acts to prevent the second coupling portion 200 and the first coupling portion 100 from axially dislodging after the first and second filter sections 42, 44 are connected by the first and second coupling portion 100, 200 and particularly curved portion 126 and coupling hook 228.

Once the sections 125 have flexed to enter their extended state they pass over the coupling hook 228 of the second coupling portion 200. Then, after sufficient axial force has been applied to the first and second coupling portions 100, 200 such that sections 125 have passed over the coupling hook 228, the sections 125 will return to their non-extended state where the hook 127 of the first coupling portion 100 and the coupling hook 228 of the second coupling portion 200 axially secure the first and second coupling portions 100, 200 together, which in turn secures that first and second filter sections 42, 44 together.

The prevention of the dislodging of the first and second coupling portions 100, 200 also prevents the seal formed between the gasket 204 of the second coupling portion 200 and the interior of the wall 123 of the first coupling portion 100 from inadvertently breaking after the first and second coupling portion 100, 200 are connected.

In a preferred embodiment, after the first and second filter sections 42, 44 are connected by the first coupling portion 100 of the first filter section 42 and the second coupling portion 200 of the second filter section 44, it would require between 1200-1600 pounds of pull force to separate the first and second filter sections 42, 44 due to the connection made between the first and second coupling portion 100, 200.

A method of effecting assembly and installation of the filter assembly 1 is described below. The method is directed to installing the relatively long filter assembly 1 in a new or existing baghouse 2.

The method includes providing a first and second filter section 42, 44. The first filter section 42 having a first tubular ring of filter media 20 with a mounting member 40 located at a first axial end 41 and a first coupling portion 100 located at a second axial end 43 of the filter media 20. Fluid may flow through both the first and second axial ends 41, 43 of the first filter section 42. A second filter section 44 is also provided having a second tubular ring of filter media 20 with a second coupling portion 200 located at a first axial end 45 of the filter media 20 and a closed end cap 30 located at a second axial end 46 of the filter media 20.

The installer(s) located in the clean air plenum 5 connect together the first and second filter sections 42, 44. The first and second filter sections 42, 44 are aligned along the axis 32 as shown in FIGS. 2 and 3, and the first and second coupling portions 100, 200 are engaged via an axial direction 302 (see FIG. 5).

The first and second coupling portions 100, 200 are brought together in the axial direction 302 (see FIG. 5) to an extent sufficient to cause the second coupling portion 200 to telescopically extend into the tubular section 104 of the first coupling portion 100 (as seen in FIG. 3). This causes the gasket 204 located on the second coupling portion 200 to create a strong and secure seal on the interior of the wall 123 of the tubular portion 104 of the first coupling portion 100.

During the coupling process, sections 125 enter their extended state by flexing radially outwardly relative to axis 32 to pass over the coupling hook 128 of the second coupling portion 200.

Once enough axial force has been applied to the first coupling portion 100 to push sections 125 over the coupling hook 228 the sections 125 will return to their non-extended state and engage with the coupling groove or catch 219 created by the coupling hook 228.

As discussed above, the groove 113 of the first coupling portion 100 prevents a user from inadvertently inserting the second coupling portion 200 too far within the tubular portion 104 of the first coupling portion 100 by acting as a stopping point for which the top portion 220 of the second coupling portion 200 can no longer be axially inserted within the tubular portion 104 of the first coupling portion 100 (see FIG. 3).

Further, as also discussed above, when the second coupling portion 200 is inserted within the tubular section 104 of the first coupling portion 100 the top portion 220 of the second coupling portion 200 and the groove 113 of the first coupling portion 100 (see FIG. 3) make contact, which prevents the second filter section 44 from tilting relative to the first filter section 42 when the filter assembly 1 is coupled with a tubesheet 7 (see FIG. 1).

The engagement of the sections 125 of the flange coupling portion 106 with the catch 219 of the hook portion 218 acts to ensure that a strong and robust seal is not broken between the gasket 204 and the interior of the wall 123 of the tubular section 104 of the first coupling portion 100 by preventing the first coupling portion 100 from moving in an axial direction away from the second coupling portion 200, such that the second coupling portion 200 would be dislodged from the tubular portion 104 of the first coupling portion 100. As discussed above, this also prevents the inadvertent dislodging of the gasket 204 from the interior of the wall 123 of the tubular section 104, which has created the strong and robust seal between the first and second coupling portions 100, 200 of the first and second filter sections 42, 44.

Finally, the installer(s) will connect the mounting sleeve 40 of the filter assembly 1 to a vacant opening 6 of the tube sheet 7 to create a substantially gas-tight seal between the mounting band 12 located in the opening 6 of the tube sheet 7 and the assembled filter assembly 1.

It will be apparent that in an alternative method for installing the filter assembly 1, the installer(s) can first connect the first filter section 42 to the mounting band 12 located to the vacant opening 6 of the tube sheet 7 via the mounting sleeve 40 to create a substantially gas-tight seal between the mounting band 12 located in the vacant opening 6 of the tube sheet 7 and the first filter section 42. Then the user can connect the second filter section 44 to the first filter section 42 using the same steps described above to create a substantially gas-tight seal between the first filter section 42 and the second filter section 44 and to complete the assembly of the filter assembly 1.

It will be apparent that in an alternative method for installing the filter assembly 1, the installer(s) can first insert the second filter section 44 partially through the opening 6 of the tube sheet 7. Then as the second filter section 44 is partially inserted through the opening 6 of the tube sheet 7 the installer can connect the second filter section 44 to the first filter section 42 using the same steps described above to create a substantially gas-tight seal between the first and second coupling portions 100, 200 of the first filter section 42 and the second filter section 44 to complete the assembly of the filter assembly 1. Then the installer can use an axial force on the assembled filter assembly 1 in a direction toward the opening 6 of the tube sheet 7 until the mounting sleeve 40 of the first filter section 42 creates a substantially gas-tight seal with the mounting band 12 located in the vacant opening 6 of the tube sheet 7.

Next, to disconnect the installed first and second filter sections 42, 44 coupled together by the first and second coupling portions 100, 200 the sections 125 of the flange coupling portion 106 can be manually displaced to elevate the lip 128 of the flange sections 125 a suitable distance radially outward relative to the coupling hook 228 to allow the sections 125 to pass over the coupling hook 228.

Once enough separation has been created between the sections 125 of the first coupling portion 100 and the coupling hook 228 of the second coupling portion 200, a user can then apply an axial force separating the first coupling portion 100 from the second coupling portion 200 to disconnect the first and second filter sections 42, 44.

It will be apparent that a filter assembly 1' with a slightly different structure may optionally include a third filter section 49' and even additional filter sections (not shown). The third or additional filter sections 49' are located between and connected to the second filter section 44 and the first filter section 42 to provide flexibility in establishing a length of the filter assembly 1'. The third filter section 49' would have open axial ends and connecting structure at both ends.

Turning to FIG. 7, illustrating an exemplary embodiment of a partially assembled filter assembly 1' with second and third filter sections 44', 49' coupled together and can include all of the other features discussed herein.

The partially assembled filter assembly 1' has second filter section 44' that is not connected with a first filter section 42 having a mounting sleeve 40 to couple the filter assembly 1' to a tube sheet 7 (see FIGS. 2 and 3). Rather, the second filter section 44' is connected to a third filter section 49'. The third filter section 49' has a piece of filter media 20 and a first coupling member 100 coupled to the filter media 20 at the second axial end 43' of the third filter section 49' and a second coupling member 200' coupled to the filter media at the first axial end 41' of the third filter section 49'.

As will be understood a first filter section 42 having a mounting member 40 located at its first axial end 41 (see FIGS. 2 and 3) could connect its first coupling portion 100 to the second coupling portion 200' of the third filter section 49'. This would result in a filter assembly 1' having a third filter section 49' between the first filter section 42 (see FIGS. 2 and 3) and the second filter section 44'.

As will also be understood any number of third filter sections 49' may be directly connected together axially interposed between a first and second filter section 42, 44 to provide a filter assembly 1' of a desired length.

In another exemplary embodiment, the first filter section 42 has a first coupling portion 100 with a coupling hook 228 and the second filter section 44 has a second coupling portion 200 with a coupling portion 106 including sections 125 that make up the hook 127.

According to another exemplary embodiment it is envisioned that a first filter section 42 has a first coupling portion 100 with a coupling hook 228 located along the interior of the wall 123 of tubular section 104 and the second filter section 44 has a second coupling portion 200 with a coupling portion 106 having a hook 127 made up of sections 125 that extend radially inward toward axis 32 when the sections 125 are in their extended state.

In the above exemplary embodiment, the first and second coupling portion 100, 200 will be connected by aligning the first and second coupling portions 100, 200 and applying an axial force to the first and second coupling portions 100, 200 such that the second coupling portion 200 telescopically enters the tubular section 104 of the first coupling portion 100. While telescopically inserting the second coupling portion 200 into the first coupling portion 100 the sections 125 located on the second coupling portion 200 will encounter coupling hook 228 located along the interior of the wall 123 of the tubular section 104 of the first coupling portion 100.

After enough axial force is applied to the first and second coupling portions 100, 200 the sections 125 will flex radially inwardly toward axis 32 and enter their extended state to pass over the coupling hook 228. Once sections 125 have passed over the coupling hook 228, the sections 125 will return to their non-extended state where the coupling hook 228 of the first coupling portion 100 and the hook 127 of the second coupling portion 200 will act to secure the first and second coupling portions 100, 200 together, which in turn will secure the respective first and second filter sections 42, 44 together to form a filter assembly 1.

According to another exemplary embodiment it is envisioned that a first filter section 42 has a first coupling portion 100 with a coupling hook 228 located along the exterior of the wall 123 of the tubular section 104 and a second filter section 44 has a second coupling portion 200 with a coupling portion 106 including a hook 127 that is made up of sections 125 that extend radially outward relative to axis 32 when they are in their extended state.

In the above exemplary embodiment, the first and second coupling portion 100, 200 will be axially aligned and an axial force will be applied to the first and second coupling portions 100, 200 bringing them together, such that the first coupling portion 100 telescopically enters the second coupling portion 200. As the first coupling portion 100 is telescopically entered into the second coupling portion 200 the sections 125 located on the second coupling portion 200 will encounter coupling hook 228 located along the exterior of the wall 123 of the tubular section 104 of the first coupling portion 100.

After enough axial force is applied to the first and second coupling portions 100, 200 the sections 125 will flex radially outwardly relative to axis 32 and enter their extended state to pass over the coupling hook 228 that is located on the exterior of the wall 123 of the tubular section 104 of the first coupling member 100. After that sections 125 have passed over the coupling hook 228, the sections 125 will return to their non-extended state where the coupling hook 228 of the first coupling portion 100 and the hook 127 of the second coupling portion 200 will act to secure the first and second coupling portions 100, 200 together, which in turn will secure the first and second filter sections 42, 44 together to form a filter assembly 1.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed:

1. A filter assembly comprising:
a first filter section having a first filter media attached to a first coupling portion;
a second filter section having a second filter media attached to a second coupling portion;
the first and second coupling portions forming a coupling to selectively secure the first filter section to the second filter section, the coupling fluidly communicating a first internal cavity of the first filter media to a second internal cavity of the second filter media;
the first coupling portion including a first tubular section in fluid communication with the first internal cavity, the first coupling portion including a first radially extending hook portion;
the second coupling portion including a second tubular section in fluid communication with the second internal cavity, the second coupling portion including a second radially extending hook portion;
the first or second tubular section axially receiving therein the other one of the second or first tubular section;
a seal member radially located between the first and second tubular sections preventing fluid bypass therebetween;
the first and second hook portions being configured to slide axially past one another when connecting the first filter section to the second filter section and axially engaging when attempting to axially disconnect the first filter section from the second filter section.

2. The filter assembly of claim 1, wherein the first hook portion is formed from a plurality of radially flexible sections, the radially flexible sections flexing radially from an un-flexed state as the first and second hook portions slide axially past one another when connecting the first filter section to the second filter section and then returning radially toward the un-flexed state after sliding axially past the second hook portion such that the first and second hook portions will axially engage when attempting to axially disconnect the first filter section from the second filter section.

3. The filter assembly of claim 2, wherein a slot is formed in the first hook portion between adjacent ones of the plurality of radially flexible sections.

4. The filter assembly of claim 2, wherein the first hook portion must be radially flexed prior to disconnecting the first filter section from the second filter section.

5. The filter assembly of claim 1, wherein the second filter section has a third filter coupling substantially identical to the first coupling portion; further comprising a third filter section including a fourth coupling portion substantially identical to the second coupling portion, the third filter coupling connecting with the fourth filter coupling to connect the third filter section to the second filter section.

6. The filter assembly of claim 1, wherein the second filter section further includes a mounting member for mounting the second filter section to a tube sheet and the second filter section further includes a closed end cap.

7. The filter assembly of claim 5, wherein the second filter section further includes a mounting member for mounting the second filter section to a tube sheet and the third filter section further includes a closed end cap.

8. The filter assembly of claim 1, wherein the flexible portions of the first hook portion flex radially outward and have an inner diameter smaller than an outer diameter of the second hook portion.

9. The filter assembly of claim 8, wherein the first tubular section has an inwardly extending portion and the second tubular section has a top portion;
wherein contact between the inwardly extending portion and the top portion prevents the second filter section from tilting relative to the first filter section.

10. The filter assembly of claim 1, wherein a groove is provided in the tubular section of the second coupling portion; and
wherein a gasket is located in the groove.

11. The filter assembly of claim 1, wherein 1200-1600 pounds of axial pull force is required to axially disconnect the first and second hook portions.

12. The filter assembly of claim 1, wherein the first coupling portion is formed as a part of a first end cap on a first axial end of a first piece of filter media and the second coupling portion is formed as part of a second end cap on a second axial ends of a second piece of filter media.

13. A coupler to secure a first filter section to a second filter section, the coupler comprising:
 a first coupling portion and a second coupling portion;
 wherein the first coupling portion including a first tubular section and a first radially extending hook portion;
 the second coupling portion including a second tubular section and a second radially extending hook portion;
 the first or second tubular section axially receiving therein the other one of the second or first tubular section;
 a seal member radially located between the first and second tubular sections preventing fluid bypass therebetween;
 wherein the first and second hook portions are configured to slide axially past one another and axially engaging when attempting to axially disconnect first and second hook portions.

14. The coupler of claim 13, wherein the first hook portion is formed from a plurality of radially flexible sections, the radially flexible sections flexing radially from an un-flexed state as the first and second hook portions slide axially past one another when coupling the first coupling portion to the second coupling portion and then returning radially toward the un-flexed state after sliding axially past the second hook portion such that the first and second hook portions will axially engage when attempting to axially disconnect the first and second coupling portion.

15. The coupler of claim 13, wherein a slot is formed in the first hook portion between adjacent ones of the plurality of radially flexible sections.

16. The coupler of claim 14, wherein the first hook portion must be radially flexed prior to disconnecting the first coupling portion from the second coupling portion.

17. The coupler of claim 14, wherein the first hook portion flexes radially outward and has an inner diameter smaller than an outer diameter of the second hook portion.

18. The coupler of claim 14, wherein the first or second tubular section axially receiving therein the other one of the second or first tubular section has an inwardly extending portion that acts to prevents the over insertion of the first or second tubular section being axially received.

19. The coupler of claim 14, wherein a groove is provided in the first or second tubular section; and
 the seal member is located in the groove.

20. The coupler of claim 14, wherein 1200-1600 pounds of axial pull force is required to axially disconnect the first and second hook portions.

21. A method of replacing a filter assembly within a baghouse the method including:
 removing a filter assembly to be replaced from a tube sheet and leaving a vacant opening in the tube sheet;
 selecting a first filter section having a mounting member coupled to a first axial end of a first piece of tubular filter media and a first coupling portion having a first radially extending hook portion located at a second axial end of the first piece of filter media;
 selecting a second filter section having a second coupling portion having a second radially extending hook portion coupled to a first axial end of a second piece of tubular filter media to provide fluid communication between the first and second filter sections and a closed end cap coupled to a second axial end of a second piece of tubular filter media; and
 wherein the first and second hook portions are configured to slide axially past one another and axially engage when attempting to axially disconnect the first and second hook portions.

22. The method of claim 21, further comprising partially inserting the second filter section axially into the vacant opening in the tube sheet.

23. The method of claim 22, further comprising:
 coupling the first coupling portion to the second coupling portion such that a seal member radially located between the first and second coupling portions prevents fluid bypass therebetween.

24. The method of claim 23, further comprising:
 axially sliding the coupled first and second filter sections axially along the opening of the tube sheet until a gas-tight seal is formed between the mounting member and the tube sheet.

* * * * *